United States Patent [19]
Storey et al.

[11] Patent Number: 5,882,524
[45] Date of Patent: Mar. 16, 1999

[54] TREATMENT OF OIL-CONTAMINATED PARTICULATE MATERIALS

[75] Inventors: Dale Storey; Kevin Lundie, both of Locombe, Canada

[73] Assignee: Aquasol International, Inc., Calgary, Canada

[21] Appl. No.: 864,184

[22] Filed: May 28, 1997

[51] Int. Cl.⁶ .............................. B08B 3/08; B01D 21/01; B01D 21/26; B01D 37/00
[52] U.S. Cl. .......................... 210/712; 210/737; 210/738; 210/768; 210/772; 210/774; 210/787; 210/805; 210/806; 210/167; 134/10; 134/251; 134/33; 134/60; 175/66
[58] Field of Search ....................................... 210/702, 712, 210/737, 738, 768, 772, 774, 780, 785, 787, 805, 806, 167, 17 S, 195.1, 202, 210, 259, 295, 297, 304, 336.1, 388, 391, 394, 411; 134/10, 25.1, 33, 60; 175/66

[56] References Cited

U.S. PATENT DOCUMENTS

| | | | |
|---|---|---|---|
| 4,793,423 | 12/1988 | Knol | 175/66 |
| 5,053,082 | 10/1991 | Flanigan et al. | 134/25.1 |
| 5,454,957 | 10/1995 | Roff | 210/768 |
| 5,490,928 | 2/1996 | Tanii | 210/394 |

*Primary Examiner*—David A. Reifsnyder
*Attorney, Agent, or Firm*—Charles D. Gunter; Andrew J. Dillon

[57] ABSTRACT

A closed loop process is shown for treating oil and saline contaminated particulate materials such as drilling cuttings such as are encountered in oil and gas well bore drilling operations. The process includes at least two washing stages and three solids separation stages. A process fluid tank utilizes an auger to remove deposited solids from the process fluid while hot gases being bubbled through the tank facilitate separation and skimming of oil and hydrocarbon components from the tank surface.

16 Claims, 1 Drawing Sheet

TREATMENT OF OIL-CONTAMINATED PARTICULATE MATERIALS

BACKGROUND OF THE INVENTION

1. Field of the Invention:

The present invention relates generally to a process for treating oil-contaminated particulates, such as drilling cuttings, and particularly those in which the salt content is high enough to present a disposal problem. More specifically, the invention relates to a staged washing and solids removal process for treating particulate materials such as drilling cuttings or drilling mud pit residues to produce a source of desalinated solid particles suitable for various uses or disposal as a non-hazardous waste.

2. Description of the Prior Art:

Oil and gas well drilling fluids, known in the industry as "muds", have been known for many years. The return of this mud from the borehole where the drilling occurs includes cuttings and other materials that were not originally present in the mud. In an oil-based mud drilling operation, there are typically two liquids (diesel and water) that normally become waste and are environmentally hazardous. When drilling with oil-based mud, the drilling rig must be washed with diesel in order not to contaminate the mud with water. Other sources of contamination exist on the rig, as well.

In various regions, tanks are used for storing drilling fluids and cuttings where reserve pits are not permitted. Also, removal may be required from presently existing reserve pits. In the reserve pits, the used drilling fluid contents are typically contaminated by, for example, top soil used in constructing the pit. Unclaimed mud, diesel and other effluents from the well may be dumped into a pit with significant pollution.

An object of the present invention is to provide a closed loop process for treating contaminated clays, sands, fines, gravels, drilling cuttings, or other solids or particulate containing fluids to produce an environmentally acceptable product.

The present invention also has as an object to provide a closed loop system for effectively removing oil, salt water residue, diesel or other contaminants produced by the drilling operation so that they are separated from the cuttings produced in the drilling process and are not otherwise dumped into the environment, as in the prior art.

Another object of the invention is to avoid the onerous expense of hauling contaminated cuttings and particulate materials from reserve pits or tanks to hazardous waste disposal locations which may be hundreds of miles from the well being drilled.

Another object of the invention is to provide a closed loop process for the treatment of particulate materials which is effective to remove, reduce and separate both chlorides and hydrocarbons from such materials, using only a small amount of water and leaving an environmentally acceptable product.

SUMMARY OF THE INVENTION

The closed loop process of the invention is used to treat oil-contaminated particulate materials. The oil-contaminated particulate materials are first fed to a trommel. Process fluid is introduced to the trommel so as to contact the oil-contaminated particulate materials for a desired exposure time in a first washing stage. The particulate materials are contacted with process fluid in a second washing stage while simultaneously mechanically separating a first portion of the particulate solids in a first solid separation stage. The process fluid containing remaining solid fines which exits the second washing stage is then subjected to centrifugal separation, thereby producing a second portion of separated particulate solids and discharged process fluid. The discharged process fluid is passed from the centrifugal separator to a process fluid tank where oils are removed from the process fluid and are passed to storage. A portion of the process fluid is recirculated from the process fluid tank to the trommel to thereby form a closed fluid loop.

In a particularly preferred embodiment of the invention, the closed loop process is used to treat oil and saline contaminated drilling cuttings from shale shakers, mud cleaners, centrifuges, mud tanks, and the like, at a well site. Mud is preliminarily separated from the cuttings and the remaining oil-contaminated cuttings are fed to the trommel. Process fluid is introduced to the trommel so as to contact the oil contaminated drill cuttings for a desired exposure time in a first washing stage. The drill cuttings are contacted with process fluid at a vibrating screen deck in a second washing stage while the deck simultaneously causes mechanical separation of a first portion of particulate solids in a first solids separation stage. A flocculent can be introduced into the process fluid which exits the vibrating screen deck with the flocculated process fluid containing remaining solid fines being passed to a decanter type centrifuge, thereby producing a second portion of separated particulate solids as one stream and discharged process fluid as a separate stream. The discharged process fluid is passed from the decanter type centrifuge to a process fluid tank where oils are removed from the process fluid and passed to storage. A portion of the process fluids is withdrawn from the process fluid tank and heated prior to being recirculated to the trommel to thereby form a closed fluid loop. The process fluid in the closed fluid loop is most preferably maintained in the range from about 95°–98° C.

Additional objects, features and advantages will be apparent in the written description which follows.

DETAILED DESCRIPTION OF THE INVENTION

Figure 1:
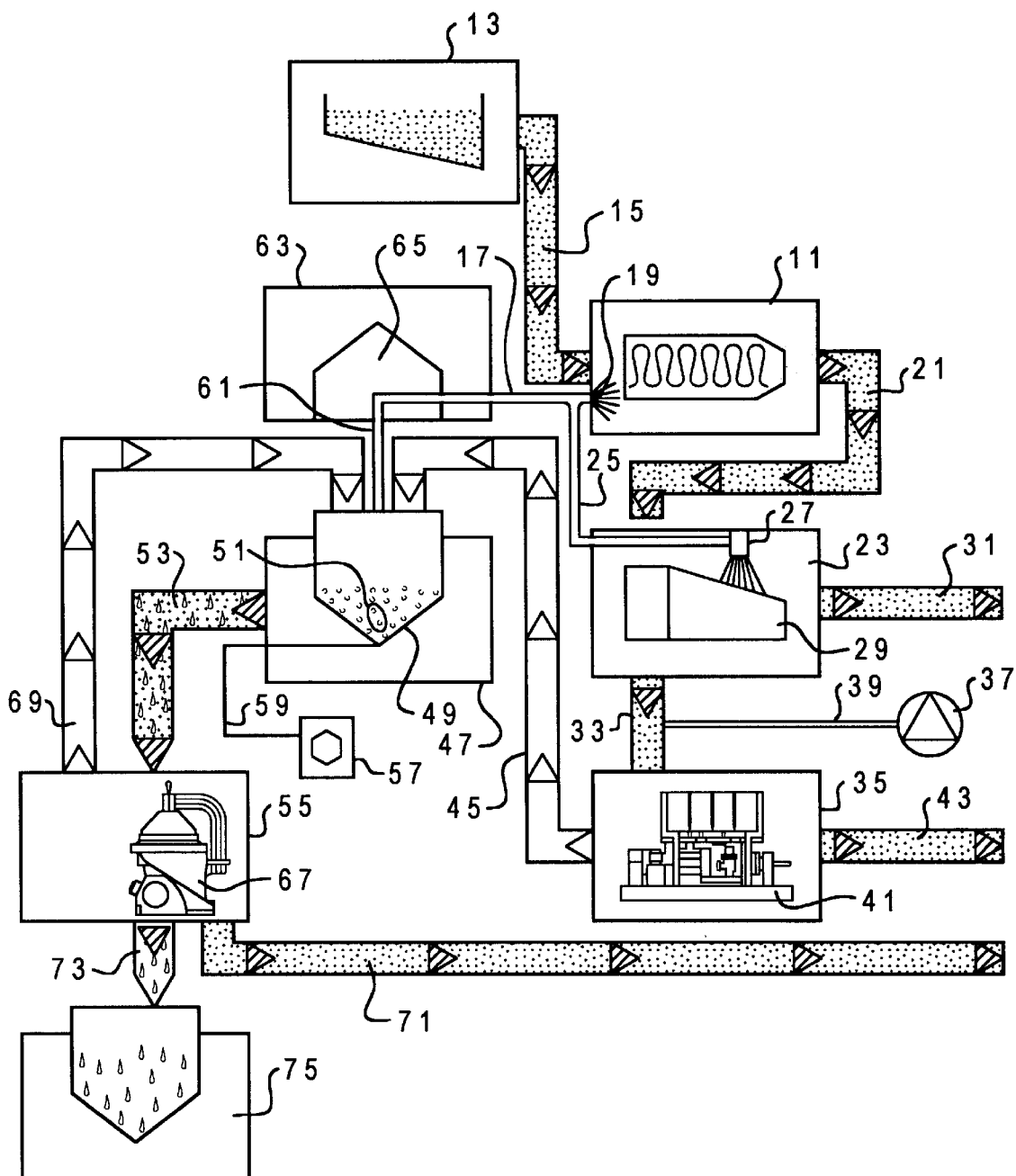
FIG. 1 is a simplified process flow diagram illustrating the steps in the closed loop process of the invention.

Turning to FIG. 1, there is shown in simplified fashion a closed loop process for the treatment of oil-contaminated particulate materials. While the process of the invention is especially well suited for reducing and/or removing hydrocarbons and chlorides from clays, sands, fines, gravels, drill cuttings, and similar type solids, the process can also be adapted for other diverse uses, such as soil remediation, power plant and utilities particulate emissions treatment, treatment of contaminates from pulp and paper, marine, petrochemical, chemical, mining and quarries, agriculture, construction, etc.

With respect to the well drilling application of the process of the invention, mud effluent from the well is typically introduced to shale shakers and travels from the shakers to active mud tanks as is well known in the art. Mud effluent from mud cleaners also travels to the active mud tanks, as in known in the art. Mud pumps connected to the tanks convey mud back to the rig. In the prior art, effluent waste from the shale shakers, active mud tanks and mud cleaners are typically dumped into a disposal pit.

In the present invention, drilling cuttings contaminated with oil, entrained mud and liquid effluents are discharged from the shale shakers, mud cleaners, centrifuges, and the like to a trommel (11 in FIG. 1) to begin the process of the present invention. The particulate materials may be fed to the initial phase of the process comprised by the trommel in a number of different ways, depending upon the particular application at hand. For example, chain slat feeders, rubber belt feeders or screw type conveyors or augers can all be successfully utilized. In the embodiment of the invention illustrated in FIG. 1, an auger 13 is used to feed particulate materials to a conveyor 15 so that the contaminated particulates enter the trommel 11 at a consistent feed rate.

The first phase of washing of the particulate materials occurs at the trommel 11. The trommel comprises a large cylindrical or barrel-shaped structure which can generally range in diameter from about 36 inches to 76 inches or more. The length of the trommel varies upon the particular application between about 10 to 55 feet or more. In the preferred embodiment illustrated, the trommel 11 is approximately 20 feet in length and has a minimum diameter of approximately 48 inches. The trommel also has a degree of inclination and speed which are adjusted to increase or decrease the exposure time of the materials within the trommel, sometimes referred to as the "residence time." The preferred residence time varies with the particular application at hand. An increase in residence time is required when dealing with heavily contaminated particulates and a decreased residence time can be utilized when the particulate materials are not as heavily contaminated.

In a typical working example, a trommel 20 feet in length, with a 48 inch minimum diameter created sufficient residence time to enhance the separation of contaminants from produced sands. As an example, produced sand high in chlorides and heavy oil was washed with the aforesaid trommel inclined at an angle of about two degrees, with respect to the horizontal plane, at a rotation speed of 10 rpm. Process fluid was injected into the trommel at about 60 gallons per minute at a temperature of 90° C. With the trommel dimensions as specified, the entering solids material required approximately two minutes to be conveyed through the trommel by tumbling action on an incline, assisted by the pressure of the incoming process fluid.

The above conditions resulted in a process throughput of approximately 12 tons per hour. The throughput was calculated by scaling the wheel loader's weight and recording the number of brackets introduced into the fuel hopper 13 over a given time interval.

Returning to FIG. 1, the particulate materials are contacted with process fluid passing through the conduit 17 and out the spray nozzles 19 in a first washing stage. Typical flow rates of process fluid are 50 to 150 gallons per minute through the conduit 17 to effectively expose the contaminated solids to process fluid maintained at a temperature in the range from about 85°–100° C., preferably in the range from about 90°–98° C.

Although a number of commercially available detergent type process fluids might be utilized in the process envisioned, the preferred process fluid is a biodegradable, non-flammable water-based cleaning solution sold under the trade name "AQUASOL" by Aquasol International, Inc. of Alberta, Canada. AQUASOL is a proprietary blend of surfactants, wetting agents, dispersants and chelating agents that, when heated and maintained in a desired temperature range, can be used to clean, remove, reduce and separate hydrocarbons and chlorides from contaminated particulate materials. AQUASOL effectively removes, reduces and separates both chlorides and hydrocarbons from solid particulate materials using small amounts of water, producing an environmentally acceptable product. AQUASOL is water based, having a boiling point of 100° C., a pH of 11.0, no flash point and a freezing point of 0° C.

A slurry exits the trommel 11 through conduit 21 is passed to a second washing stage which occurs in a mechanical separation unit 23. The second washing stage 23 preferably includes a vibrating screen deck 29 where washing and simultaneous first solids separation occur. This is accomplished by contacting the cuttings with process fluid passing through conduit 25 to spray nozzles 27. Solids larger than about 100 microns are separated by the vibrating screen and are discharged through a discharge conduit 31 as finished product.

Any of a number of commercially manufactured vibrating screen decks can conveniently be utilized in the mechanical separation unit 23 with choice being based primarily upon supply and dealer location. As solids pass over the vibrating screen and are again exposed to the high temperature process fluid exiting the spray nozzles 27, the second washing phase further enhances the cleaning efficiency of the process with the washed solids being ejected from the vibrating screen relatively clean and dry.

The remaining fine solids and process fluid exiting as a slurry in the conduit 33 are pumped to a second stage solids separation station 35. Preferably, the injection pump 37 is used to introduce a flocculent to the process fluid stream before the stream enters the second stage solids separation unit 35. A mixing tube 39 thoroughly exposes the flocculent to the process fluid stream. The mixing tube 39 preferably has a series of baffles and solid turbulators (not shown) to thoroughly expose the flocculent to the solids contained in the process stream. The flow rate of the flocculent is set by introducing more or less flocculent to the process stream until clean overflows are generated from the centrifuge 41. The flocculent is used to cause aggregation of the suspended solid particles to form a larger particle mass, thereby allowing centrifuge 41 to separate the suspended particles from the process fluid by forced coalescence. A number of flocculants are commercially available, depending upon the type of particulate solids being treated.

A typical flocculent which can be utilized for purposes of the present invention is ALKAPAM 1103 supplied by Rhone Poulenc. This commercially available product is mixed in water and agitated with a paddle-type mixer. Eight kilograms of ALKAPAM 1103 is added to four cubic meters of water to generate an approximate 3% solution. This amount of solution is sufficient to flocculate about 100 cubic meters of process fluid.

Preferably, the centrifuge 41 is a decanter type centrifuge. Alfa Lavals Model 418 is a preferred commercially available centrifuge suitable for the present process. This model centrifuge will be familiar for its use in solids control during drilling of oil and gas wells. It features a relatively high gravitational loading, due to its design and speed, to increase the level of separation between contaminate and solid particle. Centrifuge 41 continually discharges solids product through discharge conduit 43 while relatively clear process fluid is returned through conduit 45 to a process fluid tank 47.

The process fluid tank 47, in the embodiment shown, has a capacity of 9,000 liters and includes a V-shaped bottom 49 with an auger 51 running the length of the bottom of the tank. The auger or screw agitator is used to prevent a solids build-up on the bottom of the tank as solids settle out of the process fluid before they are removed from the process stream. The full length auger slowly removes solids that drop out of the process fluid to a pump (not shown) which transports the solids through a conduit 53 to a second centrifugal separation stage 55. The residence time in the tank 47 allows liberated oils and hydrocarbons to float to the surface of the process fluid contained therein to be collected and removed from the process. This can be accomplished by any type convenient skimming operation. Oil recovery and separation is enhanced by injecting heated air into the bottom of the process fluid tank. Thus, the heated air pump 57 supplies hot air through the conduit 59 to produce bubbles in the bottom of the tank to assist the oil in moving to the surface through floatation. The use of the bubble generator assists movement of the hydrocarbon constituents to the surface and allows skimmers and oil recovery equipment to work more efficiently.

Clean fluid from the process fluid tank 47 is pumped through the conduit 61 to the heating station 63 where it is heated to the 95°–98° C. range before being reintroduced through the conduit branch 17 to the trommel 11. Any type commercially available heat exchanger 65 can be used to heat the fluid to process temperature. By continuously clarifying the process fluid in the process fluid tank 47, suspended solids and oil are removed to provide a clean, closed loop system. The discharged process fluid passing out conduit 53 to a disc stack type centrifuge 67 which produces a clean process fluid stream passing out conduit 69, a decontaminated solids stream 71 and a recovered oil stream 73. The clean process fluid stream being discharged through conduit 69 is returned to the process fluid tank 47. The recovered oil passing through conduit 73 is passed to a suitable storage station 75.

EXAMPLE

Approximately 524 metric tons of invert cuttings mixed with clay were processed. The following analysis was done on the invert cuttings prior to the Aquasol Solids Process:

| pH | ds/m | 9.7 |
|---|---|---|
| EC | | 47.3 |
| Percent Saturation | | 50.2% |
| Ratio | | n/a |
| Chloride | mg/L | 16900 |
| Calcium | mg/L | 8120 |
| Magnesium | mg/L | 2.6 |
| Sodium | mg/L | 1890 |
| Sodium Adsorption Ratio | SAR | 5.77 |
| Specific Gravity (as received) | kg/m$^3$ | 1960 |
| Specific Gravity (at saturation) | kg/m$^3$ | n/a |
| Wet Bulk Density | kg/m$^3$ | 1541 |
| The composition of the sample by soxhlet extraction (wet sample): | | |
| Oil | % weight | 8.85 |
| Solids | % weight | 81.92 |
| Water | % weight | 9.23 |
| Oil (dry sample) | % weight | 9.54 |
| Oil | kg/100 m$^3$ sludge | 17346 |

During each day of production, a solid phase analysis was performed on the invert cuttings before processing and after. Using the average of 18 laboratory tests, the chlorides were reduced to 1762.5 mg/L, and the oil to 0.46%.

In terms of a material balance, the above described system has proved capable of processing 12 metric tons per hour of produced sand. Based upon a process stream flow of 230 liters per minute, approximately 1 kg of sand is being washed with 1 liter of process fluid. The system is also discharging approximately 1 liter of water to 1 kg of sand to reduce the chlorides to the low levels obtained. Depending upon the type of solid particulates being processed, and using the given sample of produced sand, the process loses about 3.5% of process fluid due to wetting of the sand. Water is added to the process stream, as necessary, to replace the liquids lost to evaporation and wetting.

An invention has been provided with several advantages. In the preferred embodiment of the invention illustrated, substantially oil and salt free particulate material from drilling fluid cuttings are made available for a number of useful purposes. For example, fine material can be used for a variety of construction purposes. Very fine materials having no particular construction value can be added to top soil or tilled with other soils for restoration of construction or drilling sites. Alternatively, the separated particulate materials may be disposed of in a manner suitable for non-hazardous waste.

The process of the invention is particularly suited to the treating of saltwater muds and drilled cuttings saturated with saline fluid or substantially any mixture containing significant portions of dissolved and granular salt, as well as reserve pit residues of drilling fluid and permeated layers of soil underlying such mud pits.

In general, the equipment describe such as pumps, screens, augers, conveyors, shakers, and the like, can be substantially any of the currently available devices or techniques designed for use in oil field operations such as the drilling of oil and gas wells.

Where desirable or necessary, the process of the invention can be operated to reduce the salinity of the produced solid particulates to a range lower than about 2,500 ppm NaCl equivalent.

While the invention has been shown in only one of its forms, it is not thus limited but is susceptible to various changes and modifications without departing from the spirit thereof.

What is claimed is:

1. A closed loop process for the treatment of oil-contaminated particulate materials, the process comprising the steps of:

feeding oil-contaminated particulate materials to a trommel;

introducing process fluid to the trommel so as to contact the oil-contaminated particulate materials for a desired exposure time in a first washing stage;

contacting the particulate materials with process fluid in a second washing stage while simultaneously mechanically separating a first portion of particulate solids in a first solids separation stage;

subjecting the process fluid containing remaining solid fines which exits the second washing stage to centrifugal separation, thereby producing a second portion of separated particulate solids and discharged process fluid;

passing the discharged process fluid from the second washing stage to a process fluid tank where oils are removed from the process fluid and passed to storage;

recirculating a portion of the process fluid from the process fluid tank to the trommel to thereby form a closed fluid loop.

2. The closed loop process of claim 1, wherein the process fluid is heated prior to reintroduction to the trommel, whereby the process in the closed fluid loop is maintained in the range from about 95–98 degrees C.

3. The closed loop process of claim 2, further comprising the step of introducing a flocculent to the process fluid which exits the second washing stage prior to the process fluid being subjected to centrifugal separation to build suspended solid particles present in the process fluid into a larger solids mass, thereby facilitating solids separation in subsequent centrifugal separation steps.

4. The closed loop process of claim 3, wherein heated air is injected into the process fluid tank to thereby enhance oil separation in the process fluid tank.

5. The closed loop process of claim 4, further comprising the steps of:

passing a portion of the process fluid from the process fluid tank to a second centrifugal separation stage which produces a clean process fluid stream, a decontaminated solids stream and a recovered oil stream.

6. The closed loop process of claim 5, wherein the clean process fluid stream is returned from the second centrifugal separation stage to the process fluid tank.

7. A closed loop process for the treatment of oil and saline contaminated cuttings, the process comprising the steps of:

feeding the oil and saline contaminated cuttings to a trommel;

introducing process fluid to the trommel so as to contact the oil and saline contaminated cuttings for a desired exposure time in a first washing stage;

contacting the cuttings with process fluid at a vibrating screen deck in a second washing stage while simultaneously mechanically separating a first portion of particulate solids from the vibrating screen deck in a first solids separation stage;

introducing a flocculent into the process fluid which exits the second washing stage and passing the flocculated process fluid containing remaining solid fines which results to a decanter type centrifuge, thereby producing a second portion of separated particulate solids and discharged process fluid;

passing the discharged process fluid from the decanter type centrifuge to a process fluid tank where oils are removed from the process fluid and passed to storage;

withdrawing a portion of the process fluids from the process fluid tank, heating the withdrawn fluids and recirculating the heated process fluids from the process fluid tank to the trommel to thereby form a closed fluid loop.

8. The closed loop process of claim 7, wherein the process fluid in the closed fluid loop is maintained in the range from about 95–98 degrees C.

9. The closed loop process of claim 8, wherein heated air from a heated air pump is injected into a lower region of the process fluid tank, thereby producing bubbles in the process fluid in the tank which assist entrained oils in floating to the surface of the process fluid tank, to thereby enhance oil separation in the process fluid tank.

10. The closed loop process of claim 9, further comprising the steps of:

passing a portion of the process fluid from the process fluid tank to a disc stack type centrifuge which produces a clean process fluid stream, a decontaminated solids stream and a recovered oil stream.

11. The closed loop process of claim 10, wherein the clean process fluid stream is returned from the disc stack type centrifuge to the process fluid tank.

12. A closed loop process for the treatment of oilcontaminated drilling cuttings from shale shakers, mud cleaners, centrifuges, and mud tanks, the process comprising the steps of:

preliminarily separating mud from the cuttings;

feeding the remaining oil-contaminated drilling cuttings to a trommel;

introducing process fluid to the trommel so as to contact the oil-contaminated drilling cuttings for a desired exposure time in a first washing stage;

contacting the drilling cuttings with process fluid at a vibrating screen deck in a second washing stage while simultaneously mechanically separating a first portion of particulate solids from the vibrating screen deck in a first solids separation stage;

introducing a flocculent into the process fluid which exits the second washing stage and passing the flocculated process fluid containing remaining solid fines which results to a decanter type centrifuge, thereby producing a second portion of separated particulate solids and discharged process fluid;

passing the discharged process fluid from the decanter type centrifuge to a process fluid tank where oils are removed from the process fluid and passed to storage;

withdrawing a portion of the process fluids from the process fluid tank, heating the withdrawn fluids and recirculating the heated process fluids from the process fluid tank to the trommel to thereby form a closed fluid loop.

13. The closed loop process of claim 12, wherein the process fluid in the closed fluid loop is maintained in the range from about 95–98 degrees C.

14. The closed loop process of claim 13, wherein heated air from a heated air pump is injected into a lower region of the process fluid tank, thereby producing bubbles in the process fluid in the tank which assist entrained oils in floating to the surface of the process fluid tank, to thereby enhance oil separation in the process fluid tank.

15. The closed loop process of claim 14, further comprising the steps of:

passing a portion of the process fluid from the process fluid tank to a disc stack type centrifuge which produces a clean process fluid stream, a decontaminated solids stream and a recovered oil stream.

16. The closed loop process of claim 15, wherein the clean process fluid stream is returned from the disc stack type centrifuge to the process fluid tank.

* * * * *